(12) United States Patent
Johnson et al.

(10) Patent No.: US 9,387,394 B1
(45) Date of Patent: Jul. 12, 2016

(54) SYSTEMS AND METHODS FOR CREATING CONTENT IN A VIRTUAL ENVIRONMENT BASED ON SOUND

(71) Applicant: AMAZON TECHNOLOGIES, INC., Reno, NV (US)

(72) Inventors: Brett Ethan Johnson, Woodinville, WA (US); Robert Duane Rost, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 97 days.

(21) Appl. No.: 14/229,714

(22) Filed: Mar. 28, 2014

(51) Int. Cl.
*A63F 13/00* (2014.01)

(52) U.S. Cl.
CPC ...................................... *A63F 13/00* (2013.01)

(58) Field of Classification Search
USPC .......................................................... 463/35
See application file for complete search history.

(56) References Cited

U.S. PATENT DOCUMENTS

| 2005/0021815 | A1* | 1/2005 | Haneda | .................. | G10L 19/167 |
| | | | | | 709/231 |
| 2006/0010075 | A1* | 1/2006 | Wolf | .............................. | 705/57 |
| 2009/0277065 | A1* | 11/2009 | Clark | ...................... | F41A 19/04 |
| | | | | | 42/1.03 |

OTHER PUBLICATIONS

Author Unknown, "Audiosurf Ride Your Music" screenshot from http://audio-surf.com, Retrieved from the internet on Mar. 18, 2014, 1 page.
Corvus Elrod, "Review: Audiosurf", screenshot from http://escapistmagazine.com/articles/view/editorials/reviews/2936-Review-Audiosurf, Feb. 15, 2008, pp. 1-4.
Joe Martin, "Audiosurf", screenshot from http://www.bit-tech.net/gaming/pc/2008/02/26/audiosurf/1, Feb. 26, 2008, pp. 1-6.
Eric-Jon Waugh, "GDC: Sound and Perspective in Experimental Games", Gamasutra—GDC 2007 Event Coverage, screenshot from http://www.gamasutra.com/gdc2007/indez.php?id=104027, Mar. 9, 2007, pp. 1-5.

* cited by examiner

*Primary Examiner* — Pierre E Elisca
(74) *Attorney, Agent, or Firm* — Robert C. Kowert; Meyertons, Hood, Kivlin, Kowert & Goetzel, P.C.

(57) ABSTRACT

Systems and method for creating content in a virtual environment based on sound include components and operations that analyze audio data to identify specific sound qualities or characteristics, such as a specific frequency, period, wavelength, note, key, amplitude or the like that are present in the sound. For an identified sound quality or characteristic, the systems and methods may determine a corresponding or associated virtual content, (or an aspect of the virtual content), and generate that virtual content or that aspect of the virtual content in the virtual environment. The virtual content may be persistent among users and instantiations of the virtual environment. Examples of the virtual content that may be generated include an object, an action, a change to existing content and a real-time change command. Examples of the virtual environments that may include the generated content include a video game, a desktop, and an animated movie.

20 Claims, 5 Drawing Sheets

SYSTEMS AND METHODS FOR CREATING CONTENT IN A VIRTUAL ENVIRONMENT BASED ON SOUND

BACKGROUND

In conventional virtual environment design and development, (e.g., the design of a video game, a virtual desktop or an animated movie), an object, (e.g., a weapon, an icon, a character, an background feature), is created by generating its visual aspects (e.g., a 2D or 3D model) and programming its functional aspects first (e.g., what and how a weapon shoots, what function an icon performs when it is clicked on, how the character moves and its abilities, what happens when an object interacts with an background feature), and then later adding sounds that correspond to actions by or interactions with the object. For example, in conventional video game design, a gun may be created as an object in the video game's virtual environment by generating a 3D model of the gun and then programming into the model the gun's functionality, such as what the gun shoots (e.g., bullets, laser, grenades, etc.) and how the gun shoots (e.g., its rate of fire, range, etc.). Finally, the designer adds sounds that correspond to the gun's visual look and functions (e.g., a series of short, closely spaced, high-amplitude, staccato sounds when the gun fires bullets at a high rate of fire). Thus, the sound design is reactive to the visual and functional designs that preceded it.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DETAILED DESCRIPTION

Reference will now be made in detail to various examples and embodiments of the invention, some of which are illustrated in the accompanying drawings. Wherever convenient, the same reference numbers will be used throughout the drawings to refer to the same or like parts.

Various implementations consistent with this disclosure take an audio or sound input and create or modify content in a virtual environment, (such as an object, an action, a background or one of their attributes), in a manner conforming, correlating or corresponding to a characteristic, attribute or quality of the sound input. In various implementations, the content in the virtual environment, or virtual content, may be anything that may be programmed into the virtual environment, and in various implementations the virtual content may be a persistent (e.g., permanent) part of the virtual environment. For example, in a virtual vehicle racing environment implementation, inputting a high-frequency guitar chord sound at vehicle-design time may create a vehicle with a high top speed that is lightly armored, whereas inputting a low-frequency string bass chord sound at vehicle-design time may create a vehicle with a low top speed that is heavily armored. In this example, various aspects of the created virtual content are affected by and correspond to various aspects or qualities or attributes of the input sound. In another example from a virtual vehicle racing environment implementation, inputting a human-mouth-generated, mid-frequency "ssshhhwww" sound during game-play time may change or modify a vehicle such that it has a new capability to perform the action of releasing oil on the track, whereas inputting a human-mouth-generated, high-frequency "eeeeeeeeer" sound during game-play time may change a vehicle such that it has increased ability to slow down quickly and suddenly in a manner simulating locked brakes. In this example, various aspects of an existing virtual object are changed or affected by and correspond to various aspects or qualities of the input sound during run time or during user interaction with the virtual environment.

Figure 1:
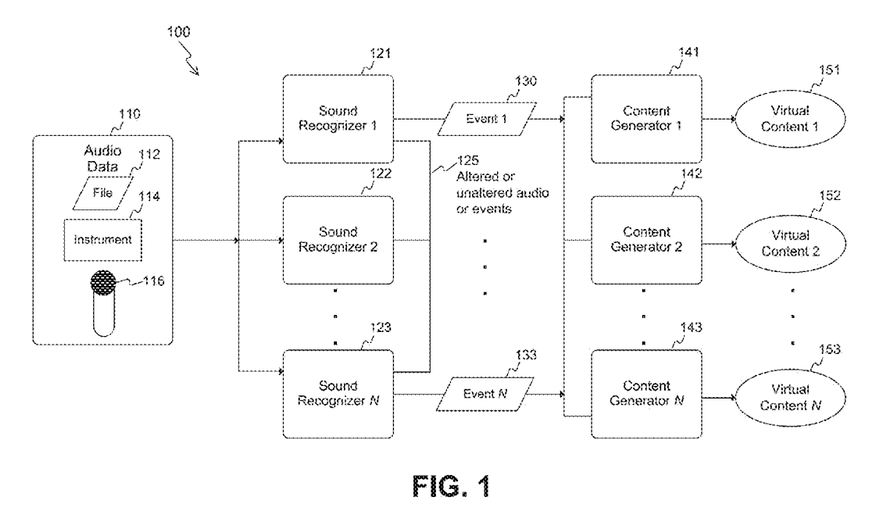
FIG. 1 is a block diagram of an example of a system for generating content, changes and actions for a virtual environment based on sound, consistent with the principles of the invention.

FIG. 1 is a block diagram of an example of a system 100 for creating content or changes to content in a virtual environment based on sound, consistent with the principles of the invention. In some implementations, system 100 may be implemented as a software application that runs on a local computing system, such as a desktop, laptop or tablet computer or smartphone, while in other implementations, system 100 may be implemented primarily as a web service using a back-end application that runs on a web-accessible computing system, such as a cloud server, and a front-end or client application that runs on a user's local computing system and that primarily functions as an interface to the back-end application.

In the example shown in FIG. 1, audio data 110 is input into, received by, encoded by or otherwise obtained by the sound recognizers 1 . . . N 121-123, where N may be any positive integer. In some implementations, the audio data 110 represents sounds that are not words, such as vocal-less music, musical notes, sound effects, recorded real-world, non-verbal sounds (e.g., a gunshot, a tweet from a bird, the squeal of a tire from an accelerating car, etc.) and the like. In some implementations, the audio data 110 may include the sounds of spoken or sung words, but as explained below, system 100 may not process the spoken or sung word sounds in a manner that determines or identifies what the words are.

In some implementations, the audio data 100 may be analog data that represents sound. In other implementations, the audio data 100 may be compressed or uncompressed digital data that represents sound, such as data in a Musical Instrument Digital Interface format (MIDI), Waveform Audio File format (WAV), Audio Interchange File format (AIFF), Sun AU file format, Pulse-Code Modulation format (PCM), Free Lossless Audio Codec format (FLAC), WavPack format, True Audio format (TTA), Adaptive Transform Acoustic Coding format (ATRAC), MPEG-4 Scalable to Lossless format (SLS), MPEG-4 Audio Lossless Coding format (ALS), MPEG-4 Direct Stream Transfer format (DST), Windows Media Audio format (WMA), MPEG-1 or MPEG-2 Audio Layer III format (MP3), Advanced Audio Coding format (AAC) or Adaptive Transform Acoustic Coding format (ATRAC) file and the like. The audio data 110 may be provided as a previously recorded/stored file 112, as output from an instrument 114, such as a MIDI keyboard, or as output from a microphone 116, such as a microphone in a local computer, smartphone or the like. The microphone 116 may capture sound waves from a human user, from an instrument (e.g., a guitar), or from recording that is being played through a loudspeaker (e.g., a CD), among other things. In some implementations, the audio data 110 may be directly and internally provided to the system 100 by a local computer that is playing sounds (e.g., music), as opposed to being converted to analog, played through a loudspeaker, captured by a microphone, and converted to digital data.

The sound recognizers 1 . . . N 121-123 recognize, detect, ascertain definitive characteristics of or otherwise identify specific attributes or qualities of the sounds in the audio data 110. In various implementations, the sound quality recognized by the sound recognizers 1 . . . N 121-123 may be any distinctive attribute or distinctive characteristic possessed by or that makes up a sound. Examples of different types of sound recognizers 1 . . . N 121-123 include audio filters (e.g., high-band pass filter and low-band pass filter), spectrum analyzers, pitch sensors, rhythm sensors, chord sensors, tempo sensors, interval sensors, repeat sensors, harmonic sensors, duration sensors, silence sensors, volume sensors, amplitude sensors and the like. Examples of different types of sound recognizers 1 . . . N 121-123 also include sensors that detect changes in a specific attribute or quality of the sound represented by the audio data 110, such as a change in frequency (e.g., musical note change or chord change), a change in volume, a change in rhythm and the like. For implementations that utilize digital audio data 110, the sound recognizers 1 . . . N 121-123 may be implemented using software for frequency analysis, waveform analysis, pattern recognition, etc., as is known in the art of digital signal processing. For implementations that utilize analog audio data 110, the sound recognizers 1 . . . N 121-123 may be implemented using circuitry for frequency analysis, waveform analysis, pattern recognition, etc., as is known in the art of analog signal processing. Implementations that utilize both analog and digital signal processing are also possible.

In various implementations, the sound recognizers 1 . . . N 121-123 do not include speech recognizers or word recognizers, which translate the spoken words of a language into text or actionable words, and the attributes or qualities of the audio data 110 that are processed for identification do not include attributes or qualities that correspond to the words of a language.

Various implementations of the sound recognizers 1 . . . N 121-123 may employ different types of signal processing to sense, determine, detect, identify or otherwise recognize various characteristics, attributes or qualities of the sound represented by the audio data 110. Examples of the sound qualities, characteristics or attributes that may be recognized include frequency, period, wavelength, note, key, amplitude, volume, harmonic, chord, pitch, timbre, rhythm, beat, interval, tempo, meter, repeat, duration, silence, articulation, staccato, legato, echo, resonance, reverberation, and any other known quality of sound or of audio data representing sound. The recognizable sound characteristics, attributes or qualities may also include changes to any of the forgoing, such as changes in a frequency, wavelength, key, amplitude, beat, etc.

As shown in FIG. 1, the audio data 110 may be input into more than one of the sound recognizers 1 . . . N 121-123, and in addition the output of each one the sound recognizers 1 . . . N 121-123 may be used as an input to others of the sound recognizers 1 . . . N 121-123, as represented by the connection 125. Also as represented by the connection 125, the output of a sound recognizer may include altered audio data (e.g., filter audio data), unaltered audio data (e.g., the same audio data that was input to a sound recognizer is passed on as input to another sound recognizer), and/or one or more events 130-133. Thus, a set of sound recognizers may identify different, specific sound qualities, attributes or characteristics in an independent or interdependent manner.

In various implementations, the sound recognizers 1 . . . N 121-123 may each produce zero or more events 1 . . . N 130-133. In the example shown in FIG. 1, sound recognizer 1 121 and sound recognizer N 123 each produce one event, but in various implementations, a sound recognizer may produce any number of events. In some implementations, multiple sound recognizers may each generate the same or the same type of event, may modify events previously produced by other sound recognizers, or may be implemented in other like variations. In various implementations, an event may be a data structure, message structure or the like indicating whether and what specific attributes or qualities of sound in the input audio data have been recognized or otherwise identified by a sound recognizer. An event may represent and describe a sound quality that is contained in the audio data 110. For example, as shown in FIG. 1, the sound recognizer 1 (121) has output the event 1 (130), where the event 1 (130) indicates that the sound recognizer 1 (121) has identified in the audio data 110 the sound quality that the sound recognizer 1 (121) was designed to identify. In various implementations, an event 1 . . . N 130-133 may include information or attributes quantifying, specifying or otherwise describing the sound quality identified by the sound recognizer. For example, a sound recognizer for identifying high-frequency notes may produce an event that includes information indicating that the sound recognizer identified a high-frequency note, and that note is a high "A" note of 880 Hz frequency and 600 milliseconds duration.

As noted previously, a sound recognizer, such as the sound recognizer 1 (121), could also output, in addition to the event 1 (130), altered or unaltered audio data 125, which may serve as an input to another sound recognizer, such as the sound recognizer N (123), which may use that input, perhaps in combination with other inputs, to produce its own event N (133), which indicates identification of another sound quality in the audio data 110 that is different from the sound quality identified by the sound recognizer 1 (121) and described by the event 1 (130).

As shown in the example of FIG. 1, the events 1 . . . N 130-133 may be input into one or more content generators 1 . . . N 141-143, where N is a positive integer. The content generators 1 . . . N 141-143 create virtual content 1 . . . N 151-153 based on the sound quality or qualities represented by the input events 1 . . . N 130-133. In various implementations, a content generator may create content based on one event (e.g., based on one sound quality that was recognized) or based on more than one event (e.g., based on more than one sound quality that was recognized). In the example shown in FIG. 1, content generator 1 141, content generator 2 142 and content generator N 143 each produce one virtual content 151-153, but in various implementations, a content generator may produce any number or amount of virtual contents. In some implementations, multiple content generators may each generate the same or the same type of virtual content, may modify virtual content previously produced by other content generators, or may be implemented in other like variations. The content generators 1 . . . N 141-143 may be designed to associate identified qualities or attributes of the input sound with corresponding aspects of virtual content, and to create virtual content having those virtual aspects that are determined by the qualities of the input sound.

In various implementations, the virtual content 1 . . . N 151-153 may be anything that may be programmed into the virtual environment, such as a programming object instantiated by one or more of the content generators 1 . . . N 141-143. In various implementations, the virtual content 1 . . . N 151-153 may be in the form of a change to virtual content that already exists in the virtual environment, for example, a command that the running virtual environment implements to change one or more aspects of a virtual object. In various implementations, the virtual content (or the change caused) may be persistent or non-transitory virtual content that is a lasting part of the virtual environment. For example, persistent virtual content may be a virtual object, virtual background, virtual terrain, etc., that remains or continues to exist in the virtual environment after being created and after the end of a user's current session or interaction with the virtual environment. In some such embodiments, persistent virtual content created by one user may be seen, encountered, used, or otherwise experienced by other users of the virtual environment at a later time.

In various implementations, the content generators 1 . . . N 141-143 may generate virtual content in the form of, for example, an object, an action, an ability, a sound, a terrain, a background, a level, a color, a change to any of the foregoing, or anything else that can be programmed as part of the virtual environment. Examples of virtual environments include a computer or video game, a desktop of an operating system, a simulation of a real world environment, a training simulation, a graphical user interface to an application and an animated movie, among other things.

For an example with respect to a desktop virtual environment, the content generator 1 (141) may create icons, such as icons for folder, files, applications, etc., as the virtual content 1 (151); the content generator 2 (142) may create the background graphic for the desktop, such as a photograph, as the virtual content 2 (152); and the content generator N (143) may create the audio sounds that are played when an icon is activated as the virtual content N (153). In this example, if the audio data 110 was a passage from the end of the "The 1812 Overture," and sound recognizer 1 (121) is a scale recognizer, then the sound recognizer 1 (121) may recognize the E-flat major scale as a sound quality found in the audio data and the content generator 1 (141) may generate (e.g., select) virtual content in the form of a set of icons that are two-dimensional based on a correspondence or correlation between the E-flat major scale and two-dimensional depiction of icons in the processing logic of the content generator 1 (141). Similarly, if the sound recognizer 2 (122) is a note recognizer and counter, then the sound recognizer 2 (122) may recognize more than 10 occurrences of the note middle C at 262 Hz as a sound quality found in the audio data and the content generator 2 (142) may generate (e.g., select) virtual content in the form of a desktop background using a picture of a sunset based on a correspondence or correlation between the middle C note and the sunset picture in the processing logic of the content generator 2 (142). Finally, if the sound recognizer N (123) is a low-frequency note recognizer, then the sound recognizer N (123) may recognize a very-low-frequency, high-amplitude sound as a sound quality found in the audio data and the content generator N (143) may generate (e.g., create) a set of low-frequency audio sounds that are played when an icon is activated on the virtual desktop based on a correspondence or correlation between the identified very-low-frequency, high-amplitude sound and the output of the algorithm used to generate icon-activation sounds in the content generator N (143).

In another example with respect the same desktop virtual environment, if the audio data 110 was a passage from the first movement of Beethoven's "Symphony No. 5" rather than a passage from the end of the "The 1812 Overture," then the system 100 may generate a set of icons that are not two-dimensional (e.g., three-dimensional) because the sound recognizer 1 (121) may identify the C-flat scale (instead the E-flat major scale) as a sound quality found in the audio data; may generate a choice of background other than the picture of a sunset based on a large number of occurrences of the note other than middle C (e.g., middle F at 349 Hz); and may generate a set of high-frequency audio sounds that are played when an icon is activated based on an absence of low-frequency, high-amplitude sound in "Symphony No. 5."

One of ordinary skill will recognize that the components and implementation details of system 100 are simplified examples presented for conciseness and clarity of explanation. Other components, implementation details and variations may be used. For example, connections that are shown as parallel in FIG. 1 could be serial. For another example, sound recognizers 1 . . . N 121-123 may be implemented as a monolithic, multi-function recognizer instead of as separate recognizers and content generators 1 . . . N 141-143 may be implemented as a monolithic, multi-function generator instead of as separate generators. Other variations are possible.

Figure 2:
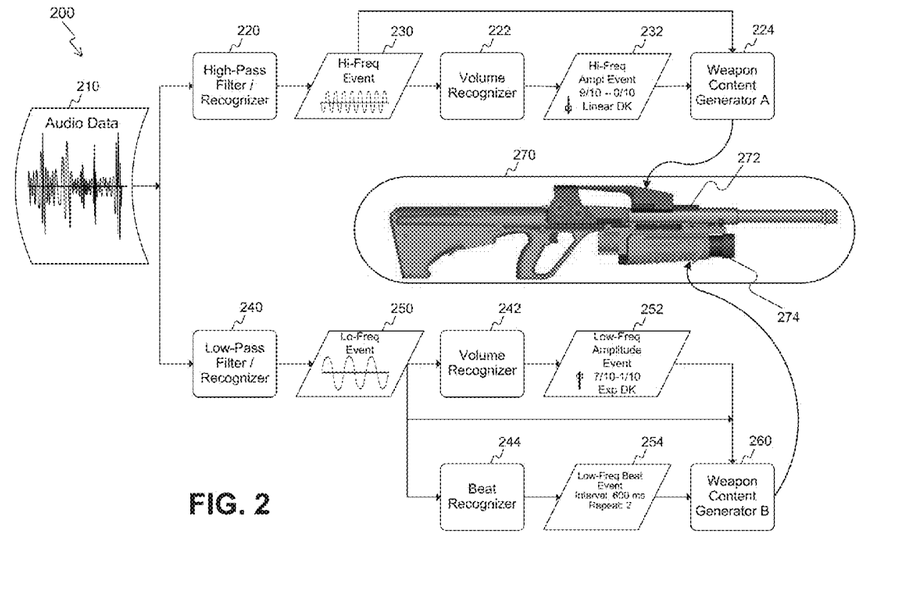
FIG. 2 is a block diagram of another example of a system for generating content for a virtual environment based on sound, consistent with the principles of the invention.

FIG. 2 is a block diagram of another example of a system 200 for generating content for a virtual environment based on sound, consistent with the principles of the invention. In this example, the virtual environment is a combat video game in which the player's character has a weapon, and the weapon content generators A 224 and B 260 are designed to generate, produce or otherwise affect certain characteristics and features of a weapon 270 based on the sound qualities in the audio data 210 that is input to the system 200. The system 200 adapts the virtual content, in this case the weapon 270, according to the characteristics, attributes or qualities of the sound represented by the audio data 210.

For this example, audio data 210 is sound that is a mixture or combination of a high-frequency sound (e.g., a high D note at 1174 Hz) that begins at a high amplitude and decays linearly to zero amplitude over 1.5 seconds, and a low-frequency sound (e.g., a low D note at 36 Hz) that pulses twice, rapidly rising from zero to a medium-high amplitude at 0.6 second and at 1.2 seconds for a duration of 350 milliseconds.

As shown in FIG. 2, the high-pass filter sound recognizer 220 receives the audio data 210 and identifies any high-frequency sound(s) in the audio data 210, for example, sounds with a frequency above 900 Hz. In this example, the high-pass filter sound recognizer 220 creates a high-frequency event 230, which indicates to the weapon content generator A 224 that the high-pass filter sound recognizer 220 identified a high-frequency quality in the sound represented by the audio data 210. In various embodiments, the high-frequency event 230 may include information and data describing attributes of the detected sound quality, in addition to, for example, a binary indication of whether or not the high-pass filter sound recognizer 220 identified any high-frequency quality. For example, the information and data in the high-frequency event 230 describing attributes of the detected sound quality may include information indicating the frequency of the recognized sound quality (e.g., 1174 Hz), the duration attribute of the sound (e.g., 1.5 second), and a filtered version of the audio data 210 (in this case, a version with low frequencies below 900 Hz filtered out), among other things.

In addition to the weapon content generator A 224, the high-frequency event 230 is also routed to a volume recognizer 222 in system 200. The volume recognizer 222 may identify the amplitude sound quality of the input audio data, which in this example is a high-pass-filtered version of the audio data 210; i.e., the filtered output of the high-pass filter sound recognizer 220, which has the low frequencies filtered out. The volume recognizer 222 creates a high-frequency amplitude event 232, which indicates to the weapon content generator A 224 that the volume recognizer 222 identified a specific amplitude quality in the recognized input sound. As with other event implementations described previously, the high-frequency amplitude event 232 may include information and data describing attributes of the detected sound quality. In this example, this may include information indicating the maximum amplitude of the high frequency sound (e.g., 9/10), the minimum amplitude (e.g., 0/10) and the type of amplitude decay (e.g., linear decay over 1.5 seconds).

After receiving the high-frequency event 230 and the high-frequency amplitude event 232, the weapon content generator A 224 generates virtual weapon content 270 for the combat video game virtual environment based on the sound qualities described by those two events 230 and 232. In the example shown in FIG. 2, the weapon content generator A 224 may create a weapon 272 that shoots a wide-beam, short-range, medium-damage-causing laser for a duration of 1.5 seconds, where the characteristics, attributes, functions, etc. of the weapon 272 (e.g., the beam-width appearance, range, damage-causing ability, shot duration and appearance of the weapon itself) are determined according to the sound qualities specified by the input events 230 and 232. As will be explained further below, in this example the weapon content generator A 224 creates only the base weapon 272, and does not create the grenade launcher 274 that is attached.

In various implementations, the weapon content generator A 224 may generate the virtual content for the weapon 272 using an algorithm, formula, look-up table or other technique that varies the output virtual content as a function of the input sound quality or qualities described by the events. Thus, in various implementations, the virtual content that is generated has features or aspects that correlate to or correspond with certain characteristics or qualities of the sound that is input to the system 200.

For an example with respect to FIG. 2, the weapon content generator A 224 may use a lookup table, such as Table 1 below, to determine how to generate virtual content for the range, barrel appearance, laser beam width and laser beam color for the virtual weapon 272 based on the high-frequency sound quality by determining which virtual content aspect(s) are associated with the input high frequency.

TABLE 1

| Input Frequency | Weapon Range | Barrel Appearance | Beam Width/Color |
|---|---|---|---|
| 900-10,999 Hz | 50 meters max | 40 cm len, 3 cm dia | 2.5 cm/red |
| 11,000-12,999 Hz | 100 meters max | 45 cm len, 2.5 cm dia | 2 cm/purple |
| 13,000-14,999 Hz | 150 meters max | 50 cm len, 2 cm dia | 1.5 cm/blue |
| 15,000-16,999 Hz | 200 meters max | 55 cm len, 1.5 cm dia | 1 cm/green |
| 17,000+ Hz | 250 meters max | 60 cm len, 1 cm dia | 0.5 cm/yellow |

Thus, in this example where the high-frequency event 230 indicates that the high-pass filter sound recognizer 220 identified a sound having a frequency of 1174 Hz (i.e., the sound quality is a frequency of 1174 Hz), the weapon content generator A 224 creates a weapon 272 having a range of 100 meters maximum that shoots a 2 cm wide purple laser beam and that has a barrel that is 45 cm long with a 2.5 cm diameter in the scale of its virtual environment, according to the association between these aspects of the virtual content and the frequency of 1174 Hz, as shown in Table 1.

For another example with respect to FIG. 2, the weapon content generator A 224 may use one or more rules, coded logic or algorithms to determine how to generate virtual content for the hit damage caused by the weapon 272 based on the frequency, amplitude, and amplitude decay qualities of the input sound. For instance, the weapon content generator A 224 may employ the following logic to generate the hit damage caused by the weapon 272 (i.e., a type of virtual content) based on the information from the high-frequency event 230 (e.g., the high frequency that was identified) and the high-frequency amplitude event 232 (e.g., the maximum amplitude, minimum amplitude and decay type that were identified):

DAMAGE=(900/input_frequency)*maximum_amplitude*100;
If decay_type=none then
decay_adjustment=0;
If decay_type=linear then
decay_adjustment=10−minimum_amplitude;
If decay_type=cubic then
decay_adjustment=20−minimum_amplitude;
If decay_type=exponential then
decay_adjustment=30−minimum_amplitude;
DAMAGE=DAMAGE−decay-adjustment;
If DAMAGE<5 then
DAMAGE=5;

Table 1 and the damage logic above are merely two examples of how to determine the association between a sound quality and a virtual content or between a sound quality and a certain aspect of the content, and many other variations and techniques are possible. Such look-up tables and logic may be implemented in software, hardware or a combination of the two.

Referring again to FIG. 2, the low-pass filter sound recognizer 240 also receives the audio data 210 and identifies any low-frequency sound(s) in the audio data 210, for example, sounds with a frequency below 130 Hz. In this example, the low-pass filter sound recognizer 240 creates a low-frequency event 250, which indicates to the weapon content generator B 260 that the low-pass filter sound recognizer 240 identified a low-frequency quality in the sound represented by the audio data 210. In various embodiments, the low-frequency event 250 may include information and data describing attributes of the detected sound quality, in addition to, for example, a binary indication of whether or not the low-pass filter sound recognizer 240 identified a low-frequency sound quality. For example, the information and data describing attributes of the detected sound quality may include information indicating the frequency of the recognized sound quality (e.g., 36 Hz), the duration of the sound (e.g., 350 milliseconds) and a filtered version of the audio data 210 (in this case, a version with frequencies above 130 Hz filtered out), among other things.

In addition to the weapon content generator B 260, the output of the low-pass filter sound recognizer 240 (e.g., the low-frequency event 250) is also routed to a volume recognizer 242 and to a beat recognizer 244 in the system 200. The volume recognizer 242 may identify the amplitude sound quality of the input audio data, which in this example is a low-pass-filtered version of the audio data 210; i.e., the filtered output of the low-pass filter sound recognizer 240, which has the medium and high frequencies filtered out. In this example, the volume recognizer 242 creates a low-frequency amplitude event 252, which indicates to the weapon content generator B 260 that the volume recognizer 242 identified a specific amplitude quality in the recognized input sound. As with other event implementations described previously, the low-frequency amplitude event 242 may include information and data describing attributes of the detected sound quality. In this example, this may include information indicating the maximum amplitude of the low-frequency sound (e.g., 7/10), the minimum amplitude (e.g., 1/10) and the type of amplitude decay (e.g., exponential decay over 175 milliseconds).

As noted, the low-frequency event 250 is also routed to a beat recognizer 244 in the system 200. The beat recognizer 244 may identify a beat sound quality in its input audio data. The beat recognizer 244 creates a low-frequency beat event 254, which indicates to the weapon content generator B 260 that the beat recognizer 244 identified a specific beat quality in the input sound. As with other event implementations described previously, the low-frequency beat event 254 may include information and data describing attributes of the detected sound quality. For example, this may include information indicating the interval of the low frequency beat (e.g., 600 milliseconds) and the number of beats in the input sound (e.g., 2).

After receiving the low-frequency event 250, the low-frequency amplitude event 252 and the low-frequency beat event 254, the weapon content generator B 260 generates virtual weapon content for the combat video game virtual environment. In the example shown in FIG. 2, the weapon content generator B 260 may generate a grenade launcher 274 that is added on to the base weapon 272. The weapon content generator B 260 may generate virtual content in the form of the characteristics, attributes, functions, etc. of the grenade launcher 274 (e.g., the range, damage-causing ability of the grenades, rate of fire, appearance, etc.) based on the sound qualities specified by the input events 250, 252 and 254. For example, the range of the grenade launcher 274 may correspond to (e.g., be a function of) the frequency and amplitude of the low frequency sound recognized by the low-pass filter sound recognizer 240 and by the volume recognizer 242; the rate of fire may correspond to (e.g., vary according to) the beat of the low frequency sound recognized by the beat recognizer 244; etc.

In various implementations of the system 200 shown in FIG. 2, if the audio data 210 did not contain a low frequency sound quality that was recognizable by the low-pass filter sound recognizer 240, then the weapon content generator B 260 would not generate the grenade launcher 274, and the base weapon 272 would have a different appearance (i.e., it would lack the grenade launcher 274 shown in FIG. 2) and it would have different capabilities or actions (i.e., it not have the capability to fire grenades).

One of ordinary skill will recognize that the components and implementation details of system 200 are simplified examples presented for conciseness and clarity of explanation and to illustrate a simple use case. Other components, implementation details and variations may be used. For example, connections that are shown as parallel in FIG. 2 could be serial. For another example, the sound recognizers 220, 222, 240, 242 and 244 may be implemented as a monolithic, multi-function recognizer instead of as separate recognizers and content generators 224 and 260 may be implemented as a monolithic, multi-function generator instead of as separate generators. For yet another example, the virtual weapon 270 may be an existing object in the virtual environment, and the weapon content generator A 224 and the weapon content generator B 224 may produce commands that change the virtual weapon 270 such that now fires a laser and has the grenade launcher 274 added to it. Other variations are possible.

As noted previously, various implementations of the virtual content generated by the system 200, in this case the virtual weapon 270, may be persistent virtual content. For instance, for a persistent virtual weapon 270 created by a video game designer at game-design time, the persistent virtual weapon 270 may be an object that continually exists as part of the game's virtual environment every time the game is played. Thus, a persistent virtual weapon 270 can be picked up, used, etc. by players every time the game is played, subject to the rules of the game. In such implementations, persistent virtual content does not have to be recreated each time the virtual environment is brought up or used.

Figure 3A:
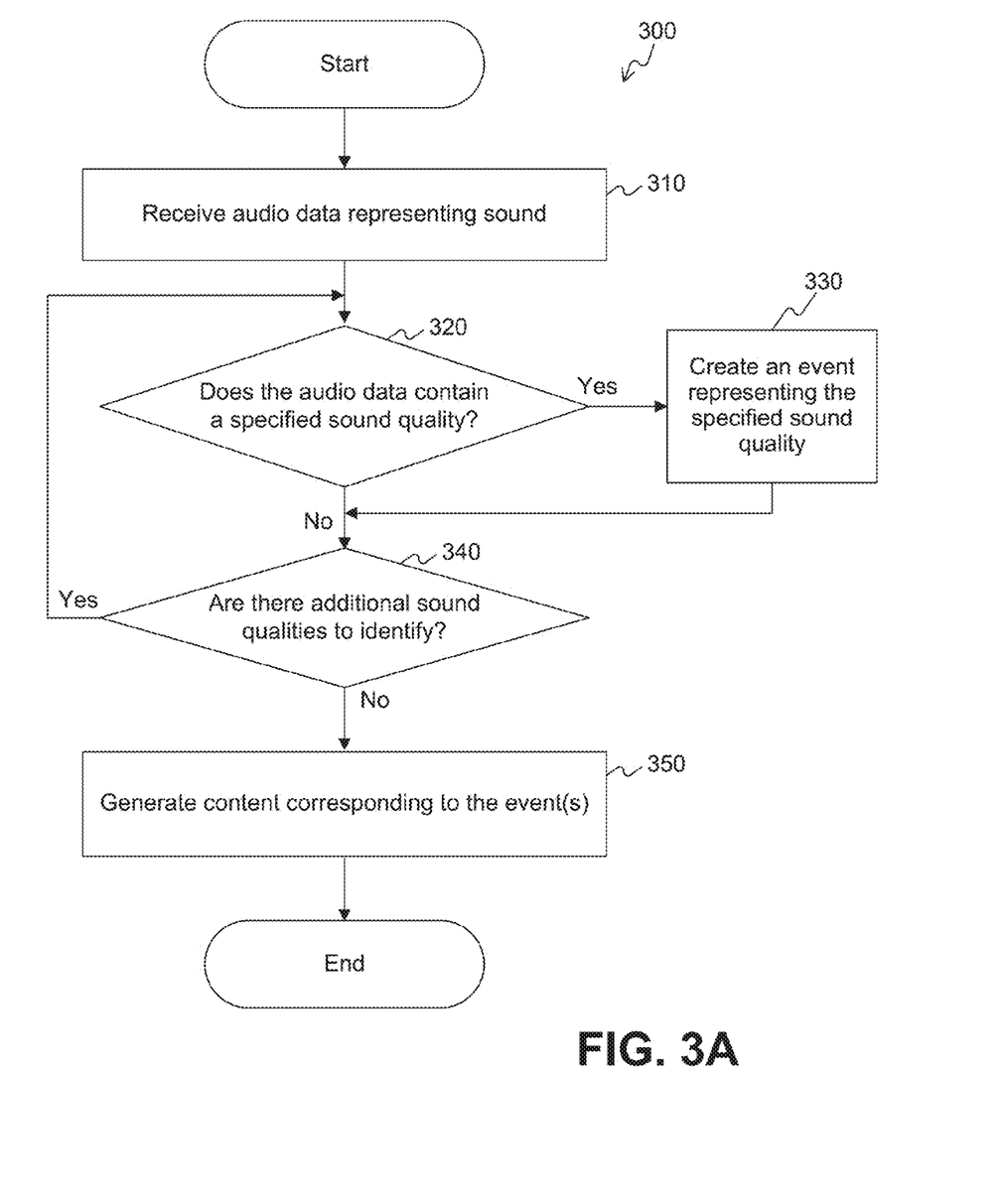
FIG. 3A is a flowchart of an example of a process for generating content in a virtual environment based on sound, consistent with the principles of the invention.

FIG. 3A is a flowchart of an example of a process 300 for generating content in a virtual environment based on sound, consistent with the principles of the invention. In some embodiments, process 300 may be implemented in software or firmware running on a local computing system, such as a laptop computer, a smartphone or the like. In some embodiments, process 300 may be implemented in software or firmware running on a server, such as a web server, that hosts a virtual environment or that provides web services to a designer of a virtual environment or to a user of the virtual environment.

In some implementations, process 300 may be employed at virtual-environment-design time, for example, at the time that a video game is being designed. In this example, during development of the virtual environment for the video game, a game designer may generate virtual content by utilizing a library of prerecorded sounds, popular songs, orchestral music, sound effects, real-world sounds (such as gunshots, vehicle sounds, etc.), fabricated sounds created by the designer and the like. For example, to design and create a weapon for the virtual environment, the designer may mix together several sounds from the library to create a sound clip or file (e.g., file 112) that the designer will to use to describe and instantiate the virtual weapon. For example, the designer may create a sound file that contains a mixture of a high-pitched, oscillating "movie-laser-like" sound and a series of closely spaced gunshot recordings and provide the sound file to process 300, which will generate corresponding virtual content—a virtual weapon in this example. In another example, the designer may create a sound file that contains a piece of classical music or a heavy-metal rock song, and provide the file to process 300 to generate a corresponding virtual weapon.

At stage 310, process 300 obtains, accepts or otherwise receives audio data representing sound. The sound represented may be practically anything, including music, sound effects, real-world sounds and human-created sounds, among other things. The sound can be composed of different sounds overlaid on each other or presented sequentially. In some implementations, the audio data may represent sounds that do not include spoken or sung words, while in others, the sounds may include words, but process 300 will process the spoken or sung words only to identify or determine whether they contains specific sound qualities or characteristics and not to determine the words themselves. In various implementations, the audio data may be in the form of a file or data structure or a stream of data from a source such as a MIDI instrument or a microphone, among other things. In some implementations, the audio data may be data as described with respect to the audio data 110 of FIG. 1. In various implementations, the audio data may be analog or digital, and if digital, it may be compressed or uncompressed.

At stage 320, process 300 determines or identifies whether the audio data contains a specified sound quality. In various implementations, stage 320 may be designed to identify one or more specified or predetermined sound qualities, such as a specified frequency, period, wavelength, note, key, amplitude, volume, harmonic, chord, pitch, timbre, rhythm, beat, interval, tempo, meter, repeat, duration, silence, articulation, staccato, legato, echo, resonance, reverberation, a specified temporal quality (e.g., a change in a sound quality over time) or a specified range (e.g., a range of frequencies or a range of chords), among other things. In various implementations, this stage may be performed by one or more sound recognizer 121-123, 220, 222, 240, 242, 244, as described with respect to FIGS. 1 and 2. In various implementations, the specified sound quality that is detected may be predetermined by the design of the sound recognizer used to detect it. In various implementations, stage 320 does not identify words in the audio data; i.e. does not perform speech recognition. In such implementations, words and their meanings are not considered to be a quality of the sound.

If stage 320 fails to detect or identify the specified sound quality in the audio data (stage 320, No), then process 300 proceeds to stage 340. If, on the other hand, stage 320 detects or identifies the specified sound quality in the audio data (stage 320, Yes), then process 300 proceeds to create an event representing the specified sound quality at stage 330. In various implementations, an event may be a means for recording and communicating the presence of a sound quality in the input audio data, such as a digital message or a data structure. In some implementations, an event may be created by one or more sound recognizer 121-123, 220, 222, 240, 242, 244, and may contain information as described with respect to events 130, 133, 230, 232, 250, 252 and 254 of FIGS. 1 and 2.

From stage 330 and from stage 320, No, process 300 proceeds to stage 340, where a decision is made as to whether there are additional sound qualities to identify in the audio data received in stage 310. As represented by stages 320, 330 and 340, process 300 may identify, and create events representing, any number of sound qualities, as any number of sound qualities may control, influence or otherwise be associated with any number of virtual content features, aspects, attributes, objects, actions, etc. If stage 340 determines that there are additional sound qualities to identify (stage 340, Yes), then process 300 loops back up to stage 320. If, on the other hand, stage 340 determines that there are not any additional sound qualities to identify (stage 340, No), then process 300 proceeds to stage 350.

At stage 350, process 300 generates virtual-environment content that corresponds to the event or events created at stage 330. Because each event represents a specific sound quality that is contained in the input audio data, various implementations of stage 350 generate content that is based at least in part on a specific sound quality. In various implementations, there is a correspondence or relationship between a sound quality that was detected or identified in stage 320 and the virtual content that is generated at stage 350, such that a change in the sound quality may cause a change in the content that is generated.

In some implementations, a sound quality may be associated with an aspect or aspects of the virtual content such that the sound quality determines what the aspect or aspects will be when the virtual content is generated. For example, in Table 1 above, the sound quality of frequency determines the weapon range, barrel appearance, beam width and beam color aspects of the generated virtual content for the weapon 272 of FIG. 2. In various implementations, stage 350 may be performed by one or more content generator 141-143, 224, 260 as described with respect to FIGS. 1 and 2. In various implementations, the virtual content that is generated may be determined by the design of each content generator.

One of ordinary skill will recognize that process 300 is presented for conciseness and clarity of explanation, and that stages may be added to, deleted from, reordered or modified within process 300 without departing from the principles of this disclosure. For example, stages 320-340 may be replaced by a single stage that identifies all the specified sound qualities at the same time, and then passes the identified sound qualities to stage 350 to generate corresponding content, without the use of events.

It should be noted that although the descriptions with respect to FIGS. 1-3A of content generators and of generating virtual content have focused on the generation of objects (e.g., weapons, icons) and the generation of aspects of objects (e.g., barrel appearance, range), the disclosed systems and processes may be used to generate practically any type of content and aspects of content that are included in a virtual environment, including, among other things, a behavior of the virtual environment (e.g., rules of interaction, rules of game play, gravity changes, background changes, color changes, terrain changes, etc.), screen effects (e.g., what is displayed when two objects interact, etc.); character abilities (e.g., whether and how a character performs actions such as moving, punching, kicking, blocking, using a tool, vehicle or weapon, etc.); level or platform features (e.g., creating terrain, weather, etc. according to the sound qualities of piece of music; for instance, create a terrain gap in a platform that characters must jump for every bass-note sound event); spawning enemies; spawning obstacles; rotation; selection of artificial intelligence (A.I.) behavior of enemies; weather; time of day; etc.

Figure 3B:
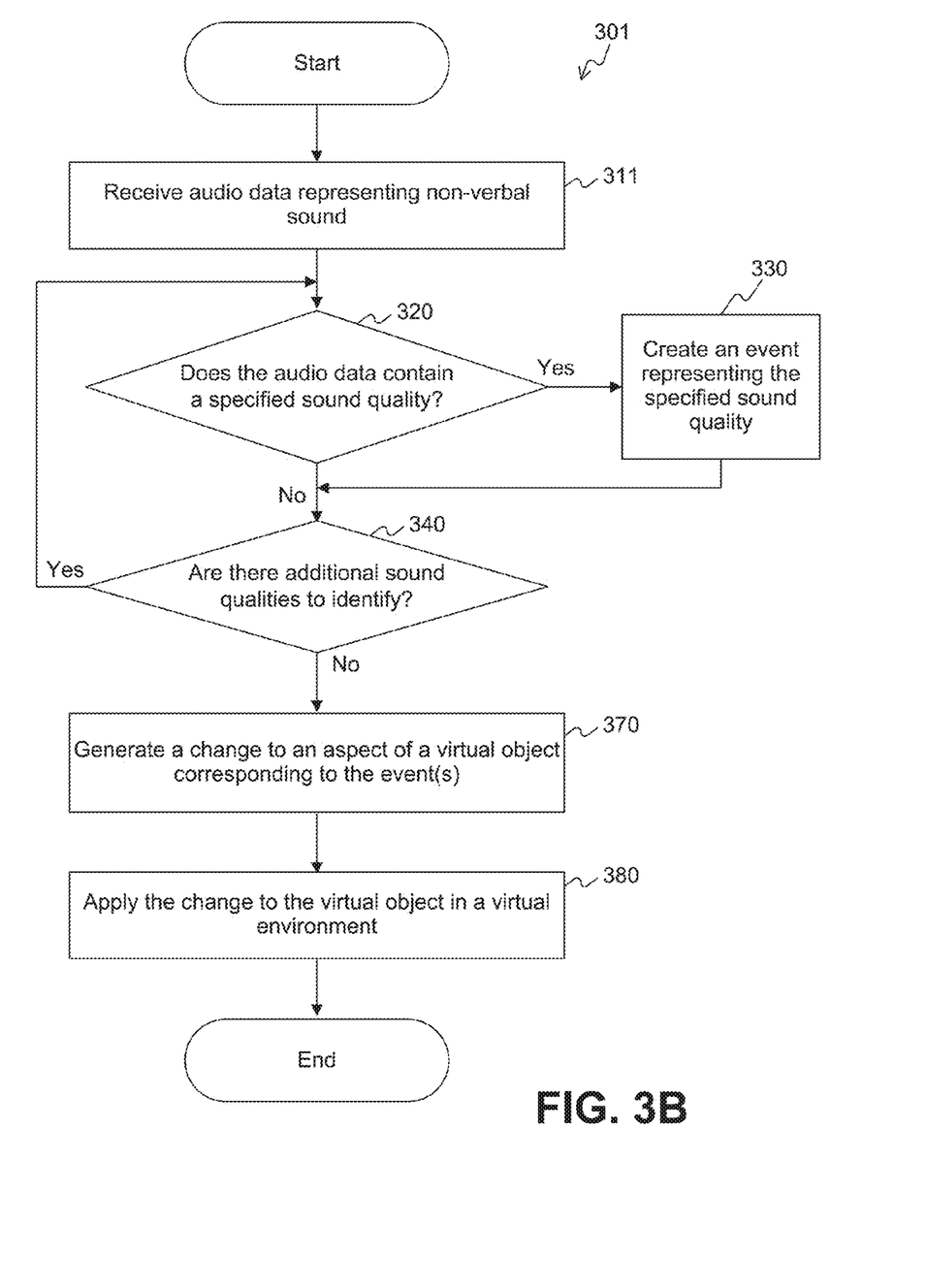
FIG. 3B is a flowchart of an example of a process for generating changes in a virtual environment based on non-verbal sound, consistent with the principles of the invention.

FIG. 3B is a flowchart of an example of a process 301 for generating changes in a virtual environment based on a non-verbal sound (e.g., sound that does not contain words or that does not have words interpreted), consistent with the principles of the invention. In some embodiments, process 301 may be implemented in software or firmware running on a local computing system, such as a laptop computer, a smartphone or the like. In some embodiments, process 301 may be implemented in software or firmware running on a server, such as a web server, that hosts a virtual environment or that provides web services to a designer of a virtual environment or to a user of the virtual environment.

In various implementations, process 301 may be employed at virtual-environment run time, for example, at the time that a video game is being played or at the time a desktop is being used. In this example, while interacting with an existing virtual environment in real-time, a user (e.g., a human) may utilize prerecorded sounds, (e.g., music, sound effects, etc.) and live, user-produced sounds, for example, sounds made when the user vocalizes with his or her mouth (e.g., by making vocal sound effects, such as imitations of gunshot, laser, screeching brake noises, etc.), sounds made by clapping, sounds made by whistling, sounds made by striking objects together, sounds made by playing a musical instrument, etc., where the sounds affect content of the virtual environment. For example, an input sound may affect appearance aspects, functionality aspects, capability aspects, action aspects, behavior aspects and the like of virtual content in the virtual environment, such as a virtual object, character, background, etc. In this example, a microphone 116 may be used by the user to input sound that results in audio data (e.g. audio data 110, 210), and the user may interact with the virtual environment (e.g., cause changes to objects and other virtual content in the running virtual environment) in real time or near real time. Such changes may include changes to an object's characteristics, such as appearance (e.g., color), functionality, etc., changes to a background depiction, changes to an arrangement of virtual objects, changes to a characteristic of a terrain feature in a video game, changes to a character's actions and interactions in a video game, etc. In various embodiments, the real time or near real time changes in the virtual environment may occur within 1000 milliseconds of production of the change-causing sound, and embodiments that produce changes in the virtual environment within 100 milliseconds or less of production of the change-causing sound will produce a desirable user experience.

In a video game example with respect to process 301, a user may drum on a table top with two pencils to cause a character's appearance and aspects to change (e.g., the character may expand horizontally and increase in virtual weight) in the game's virtual environment, and the character's width and weight may correspond to the beat of the drumming, such that a slower beat makes the character grow wider and heavier, while a faster beat makes the character grow skinnier or reduce width and weight. To further this example, the user may strike a high-pitched bell with a pencil to change the type of projectile or beam that a gun shoots (e.g., bullets, grenades, cannon shells, laser beam, etc.) in the game's virtual environment, and the gun's projectile/beam type, range, and rate of fire may correspond to the beat and frequency of the bell strikes. In these examples, the system identifies and differentiates the sound qualities of frequency (low for the desk top, high for the bell) and beat to create different changes to virtual objects, (i.e., changes to virtual content), that correspond to the identified sound qualities. Similarly, the user could play a more complex collection of sounds, such as a prerecorded pop song, into the microphone, and control the aspects of one or more objects in the virtual environment according to the sound qualities of the song. Also similarly, a user could create a feedback loop by feeding loudspeaker sounds generated by the game into a microphone that supplies process 301 with audio data, and process 301 may generate further changes (and their accompanying sounds) in the virtual environment.

At stage 311, process 301 obtains, accepts or otherwise receives audio data representing sound, which in this implementation may be non-verbal sound. The sound represented may be practically anything, including music, sound effects, real-world sounds and human-created sounds, among other things. The sound can be composed of different sounds overlaid on each other or presented sequentially. In some implementations, the audio data may represent sounds that do not include spoken or sung words, while in others, the sounds may include words, but process 301 will process the spoken or sung words only to identify or determine whether they contains specific sound qualities or characteristics and not to identify or interpret the words themselves. In various implementations, the audio data may be in the form of a file or a data structure or a stream of data from a source such as a MIDI instrument or a microphone, among other things. In various implementations, the audio data may be analog or digital, and if digital, it may be compressed or uncompressed.

To provide an illustrative use case, consider an example where the received audio data contains four sounds of pencils striking (e.g., drumming on) a table top followed by two sounds of a pencil striking a bell that produces a high-pitched C note of 4186 Hz.

At stage 320, process 301 determines or identifies whether the audio data contains a specified sound quality. In various implementations, stage 320 may be designed to identify one or more specified or predetermined sound qualities, such as a specified frequency, period, wavelength, note, key, amplitude, volume, harmonic, chord, pitch, timbre, rhythm, beat, interval, tempo, meter, repeat, duration, silence, articulation, staccato, legato, echo, resonance, reverberation, a specified temporal quality (e.g., a change in a sound quality over time) or a specified range (e.g., a range of frequencies or a range of chords), among other things. In various implementations, this stage may be performed by one or more sound recognizer 121-123, 220, 222, 240, 242, 244, as described with respect to FIGS. 1 and 2. In various implementations, the specified sound quality that is detected may be predetermined by the design of a sound recognizer. In various implementations, stage 320 does not identify words in the audio data; i.e., does not perform speech recognition. In such implementations, words and their meanings are not considered to be a quality of the sound.

If stage 320 fails to detect or identify the specified sound quality in the audio data (stage 320, No), then process 301 proceeds to stage 340. If, on the other hand, stage 320 detects or identifies the specified sound quality in the audio data (stage 320, Yes), then process 301 proceeds to create an event representing the specified sound quality at stage 330. In various implementations, an event may be a means for recording and communicating the presence of a sound quality in the input audio data, such as a digital message or data structure. In some implementations, an event may be created by one or more sound recognizer 121-123, 220, 222, 240, 242, 244, and may contain information as described with respect to events 130, 133, 230, 232, 250, 252 and 254 of FIGS. 1 and 2.

From stage 330 and from stage 320, No, process 301 proceeds to stage 340, where a decision is made as to whether there are additional sound qualities to identify in the audio data received in stage 310. As represented by stages 320, 330 and 340, process 301 may identify, and create events representing, any number of sound qualities, as any number of sound qualities may control, influence or otherwise be associated with any number of virtual content changes, change commands, actions, features, aspects, etc. If stage 340 determines that there are additional sound qualities to identify (stage 340, Yes), then process 301 loops back up to stage 320. If, on the other hand, stage 340 determines that there are not any additional sound qualities to identify (stage 340, No), then process 301 proceeds to stage 370.

Continuing the use case started above, stages 320-340 may process the audio data to identify and create an event representing the four pencil-strikes-on-the-table-top sounds and to identify and create an event representing the two high-pitched-C-note sounds.

At stage 370, process 301 generates one or more virtual-environment change(s) (e.g., command(s) that alter, modify, add, remove, or otherwise affect aspects of virtual content in the virtual environment) that corresponds to the event or events created at stage 330. Because each event represents a specific sound quality that was contained in the input audio data, various implementations of stage 370 may generate a change that is based at least in part on the specific sound quality. In various implementations, there is a correspondence or relationship between a sound quality that was detected or identified in stage 320 and the change that is generated at stage 370, such that a change in the sound quality may cause a corresponding change in the virtual object. In some implementations, a sound quality may be associated with an aspect or aspects of the virtual-environment object such that the sound quality determines what the aspect or aspects will be when a user interacts with the virtual-environment object. In various implementations, stage 370 may be performed by one or more content generator 141-143, 224, 260 as described with respect to FIGS. 1 and 2. In various implementations, the virtual content change that will be generated (e.g., a change command) in the example of FIG. 3B may be determined by the design of each content generator.

Continuing further the use case example started above, stage 370 may process the event representing the four pencil-strikes-on-the-table-top sounds to create a change command or commands that will cause the user's character object in a gaming virtual environment to increase in width and weight proportional to the intervals between the pencil strikes, and may process the event representing the two high-pitched-C-note sounds to create a change command or commands that will cause a gun object in the gaming virtual environment to change from a gun that shoots bullets to a gun that shoots laser beams for a duration approximately the same as the period during which the input bell sound drops 6 dB from peak volume and with a rate of fire approximately equivalent to the interval between the bell strikes.

At stage 380, process 301 applies the one or more virtual-environment changes (e.g., change commands) generated at stage 370 to the virtual environment. In some implementations, stage 380 may apply the virtual-environment commands in the same manner as would occur if the user had supplied an object-change command via a conventional user interface device, such as a mouse, keyboard, game controller or the like, if such a command were available.

Concluding the use case example, stage 380 may apply the change corresponding to the pencil strikes so that the user's character increases in width, (which is one aspect of appearance), on the user's screen that depicts the gaming virtual environment. The character object also increases its weight aspect, so that in game play in the virtual environment, it acts and reacts according to its new, heavier weight (e.g., the character cannot jump as high or run as fast as it could before the change). As this example illustrates, the pencil-strike sounds cause process 301 to implement a persistent change to a persistent object, in this case the character, in the virtual environment.

Stage 380 may also apply the change command or commands corresponding to the bell strikes so that a bullet-firing gun changes in appearance and ability into a laser-firing gun on the user's screen that depicts the gaming virtual environment. These change command(s), and thus indirectly the bell-strike sounds, cause process 301 to implement changes to the appearance aspects of the gun object and to the capability and functionality aspects of the gun in the virtual environment. From the user's point of view, the input sounds created real-time changes and effects to the gaming virtual environment.

One of ordinary skill will recognize that process 301 is presented for conciseness and clarity of explanation, and that stages may be added to, deleted from, reordered or modified within process 301 without departing from the principles of this disclosure. For example, stages 320-340 may be replaced by a single stage that identifies all the specified sound qualities at the same time, and then passes the identified sound qualities to stage 370 to generate corresponding changes, which may be a type of content, without the use of events. One of ordinary skill will also recognize that the use case described in conjunction with process 301 is presented for conciseness and clarity of explanation, and myriad different use cases can be applied. For example, the process 301 may receive audio data representing a popular song in stage 311 and then generate and apply changes at stages 370 and 380 that change the color(s), icon(s) or other feature(s) of the background of a virtual environment in time synchronization with the music of the song.

Figure 4:
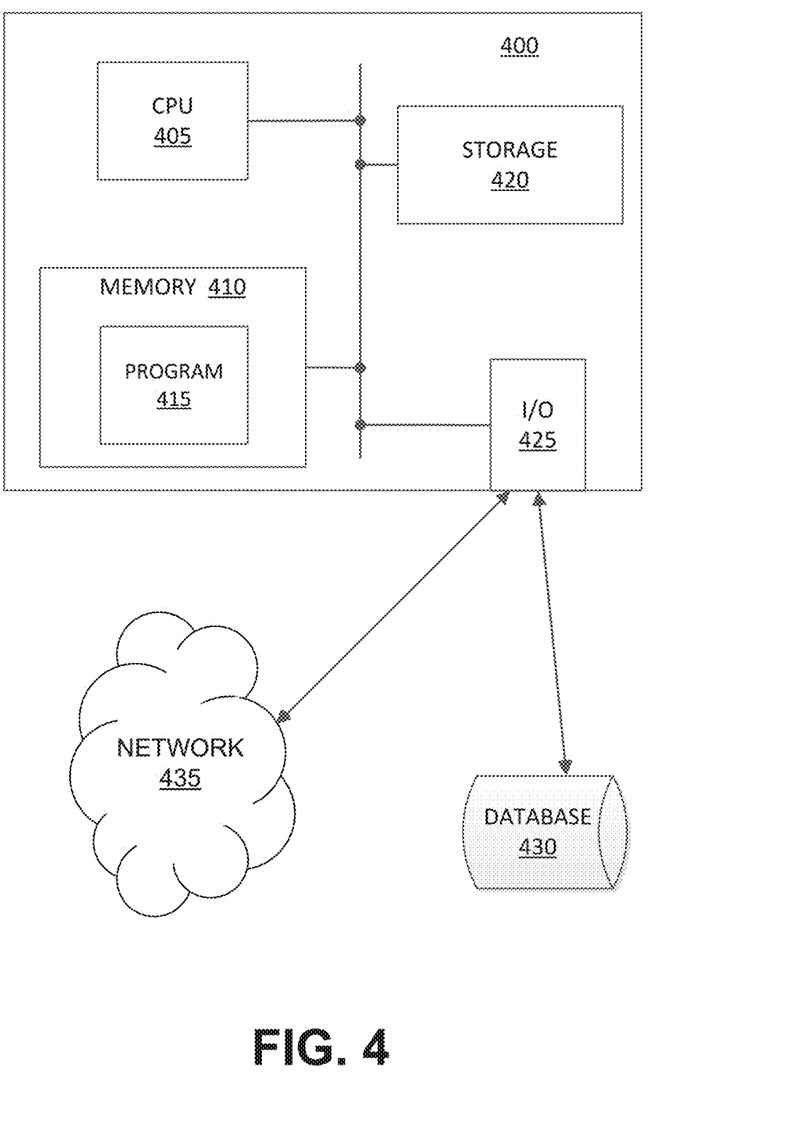
FIG. 4 is a block diagram of an example of a computing system that may be used to implement embodiments consistent with the principles of the invention.

FIG. 4 is a block diagram of an example of a computing system or data processing system 400 that may be used to implement embodiments consistent with this disclosure. Other components and/or arrangements may also be used. In some embodiments, computing system 400 may be used to implement, either partially or fully, various components of FIGS. 1 and 2, such as the sound recognizers and the content generators. In some embodiments, computing system 400 may be used to implement, either partially or fully, process 300 of FIG. 3A and process 301 of FIG. 3B, among other things.

Computing system 400 includes a number of components, such as a central processing unit (CPU) or processor 405, a memory 410, an input/output (I/O) device(s) 425 and a non-volatile storage device 420. System 400 can be implemented in various ways. For example, an implementation as an integrated platform (such as a server, workstation, personal computer, laptop computer, tablet computer, smart phone, etc.) may comprise CPU 405, memory 410, nonvolatile storage 420 and I/O devices 425. In such a configuration, components 405, 410, 420 and 425 may connect and communicate through a local data bus and may access a database 430 (implemented, for example, as a separate database system) via an external I/O connection. I/O component(s) 425 may connect to external devices through a direct communication link (e.g., a hardwired or local wifi connection), through a network, such as a local area network (LAN) or a wide area network (WAN), and/or through other suitable connections. System 400 may be standalone or it may be a subsystem of a larger system.

CPU 405 may be one or more known processors or processing devices, such as a microprocessor from the Core™ family manufactured by the Intel™ Corporation of Santa Clara, Calif. or a microprocessor from the FX™ family manufactured by the AMD™ Corporation of Sunnyvale, Calif. or the like. Memory 410 may be one or more fast storage devices, such as a solid-state storage device, configured to store instructions and information executed and used by CPU 405 to perform certain operations, functions, methods and processes related to embodiments of the present disclosure. Storage 420 may be a volatile or non-volatile, magnetic, semiconductor, tape, optical or other type of storage device or computer-readable medium, including devices such as CDs and DVDs, meant for long-term storage, which may be slower than the memory 410.

In the illustrated embodiment, memory 410 contains one or more programs or subprograms 415, which may have been loaded from storage 420 or from a remote system (not shown) that, when executed by CPU 405, perform various operations, procedures, processes or methods consistent with the present disclosure. Alternatively, CPU 405 may execute one or more programs located remotely from system 400. For example, system 400 may access one or more remote programs via network 435 that, when executed, perform functions and processes related to embodiments of the present disclosure.

In various embodiments, memory 410 may include a program(s) 415 that is a local application or a web application for creating content and/or changes to content in a virtual environment based on sound. In some embodiments, memory 410 may include a program 415 that implements at least a portion of process 300 of FIG. 3A and/or at least a portion of process 301 of FIG. 3B. In yet another embodiment, memory 410 may include a program 415 that implements at least a portion of the functionality of the system 100 described with respect to FIG. 1 and/or at least a portion of the functionality of the system 200 described with respect to FIG. 2. In some embodiments, memory 410 may also include other programs, applications or data that implement other methods and processes that provide ancillary functionality. For example, memory 410 may include programs or data used to access, receive, transmit, gather, organize, store and/or generate related data, such as audio data 110, 210 and the data organized in Table 1, etc.

Memory 410 may be also be configured with other programs (not shown) unrelated to this disclosure and/or an operating system (not shown) that performs several functions well known in the art when executed by CPU 405. By way of example, the operating system may be Microsoft Windows™, Unix™, Linux™, an Apple Computers™ operating system, Personal Digital Assistant operating system such as Microsoft CE™ or other operating system. The choice of operating system, and even to the use of an operating system, is not critical to this disclosure.

I/O device(s) 425 may comprise one or more input/output devices that allow data to be received and/or transmitted by system 400. For example, I/O device 425 may include one or more input devices, such as a keyboard, touch screen, mouse, microphone, camera and the like, that enable data to be input from a user. Further, I/O device 425 may include one or more output devices, such as a display screen, CRT monitor, LCD monitor, plasma display, printer, speaker devices and the like, that enable data to be output or presented to a user. I/O device 425 may also include one or more digital and/or analog communication input/output devices that allow computing system 400 to communicate, for example, digitally, with other machines and devices. Other configurations and/or numbers of input and/or output devices may be incorporated in I/O device 425.

In the embodiment shown, system 400 is connected to a network 435 (such as the Internet, a private network, a virtual private network or other network), which may in turn be connected to various systems and computing machines (not shown), such as servers, personal computers, laptop computers, smartphones and the like. In general, system 400 may input data from external machines and devices and output data to external machines and devices via network 435.

In the example of the embodiment shown in FIG. 4, database 430 is a standalone database external to system 400. In other embodiments, database 430 may be hosted by system 400. In various embodiments, database 430 may manage and store data used to implement systems and methods consistent with this disclosure. For example, database 430 may manage and store data structures that implement lookup tables, sound-content association rules, change commands, and the like.

Database 430 may comprise one or more databases that store information and are accessed and/or managed through system 400. By way of example, database 430 may be a noSQL database, an Oracle™ database, a Sybase™ database or some other database. Systems and methods consistent with this disclosure, however, are not limited to separate data structures or databases, or even to the use of a formal database or data structure.

One of ordinary skill will recognize that the components and implementation details of the system in FIG. 4 are examples presented for conciseness and clarity of explanation. Other components and implementation details may be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented using a computing system, comprising:
   receiving audio data;
   identifying, using the computing system, one or more predetermined sound qualities in the audio data, wherein the predetermined sound qualities of the audio data comprises one or more of a group consisting of: frequency, period, wavelength, note, key, amplitude, volume, harmonic, chord, pitch, timbre, rhythm, beat, interval, tempo, meter, repeat, duration, silence, articulation, staccato, legato, echo, resonance, reverberation, and a change in a quality that is a member of the group;
   associating each identified predetermined sound quality with an aspect of a persistent content for a virtual environment; and
   generating based at least in part on the predetermined sound qualities that were identified, the persistent content for the virtual environment, wherein the aspect of the persistent content is determined by the predetermined sound quality that is associated with the aspect.

2. The method of claim 1, wherein identifying one or more predetermined sound qualities in the audio data comprises:
   creating an event that represents the predetermined sound quality that was identified.

3. The method of claim 1, wherein the virtual environment is a computerized game.

4. The method of claim 1, wherein the persistent content for the virtual environment is an object in the virtual environment.

5. The method of claim 4, wherein the object is a weapon.

6. The method of claim 1, wherein the persistent content for the virtual environment is an ability of an object in the virtual environment.

7. A system comprising:
   a memory containing instructions; and
   a processor, operably connected to the memory, that executes the instructions to perform operations comprising:
      receiving audio data that represents sound;
      identifying a predetermined sound quality in the audio data; and
      generating persistent content for a virtual environment, wherein the persistent content corresponds to the predetermined sound quality that was identified.

8. The system of claim 7, wherein the operations further comprise:
   applying the persistent content to the virtual environment.

9. The system of claim 7, wherein the persistent content comprises a set of aspects affecting the appearance or behavior of the persistent content; and
   wherein generating persistent content for the virtual environment comprises:
      changing one or more aspect among the set of aspects based on the predetermined sound quality that was identified.

10. The system of claim 7, wherein the predetermined sound quality is an amplitude of a sound represented by the audio data; and
    wherein generating persistent content for the virtual environment further comprises:
       generating persistent content having an aspect that is correlated with the amplitude of the sound.

11. The system of claim 7, wherein the predetermined sound quality is a frequency of a sound represented by the audio data; and wherein generating persistent content for the virtual environment further comprises:
  generating persistent content having an aspect that is correlated with the frequency of the sound.

12. The system of claim 7, wherein the predetermined sound quality is a wavelength of a sound represented by the audio data; and
wherein generating persistent content for the virtual environment further comprises:
  generating persistent content having an aspect that is correlated with the wavelength of the sound.

13. The system of claim 7, wherein the predetermined sound quality is a beat in the sound represented by the audio data; and
wherein generating persistent content for the virtual environment further comprises:
  generating persistent content having an aspect that is correlated with the beat in the sound.

14. A non-transitory computer-readable medium including instructions that, when executed by a processor, perform operations comprising:
  receiving audio data that represents non-verbal sound;
  identifying a predetermined sound quality in the audio data; and
  generating a change to an aspect of an object in a virtual environment, wherein the change to the aspect corresponds to the predetermined sound quality that was identified.

15. The non-transitory computer-readable medium of claim 14, wherein the operations further comprise:
  applying the change to the aspect of the object in the virtual environment less than 100 milliseconds after receiving the audio data.

16. The non-transitory computer-readable medium of claim 14, wherein generating the change to the aspect of the object comprises:
  changing one or more aspects among a set of stored aspects that represent the object based on the predetermined sound quality that was identified.

17. The non-transitory computer-readable medium of claim 14, wherein the predetermined sound quality is an amplitude of a sound represented by the audio data; and
wherein generating the change to the aspect of the object in the virtual environment comprises:
  generating a change to an aspect of the object that is correlated with the amplitude of the sound.

18. The non-transitory computer-readable medium of claim 14, wherein the predetermined sound quality is a frequency of a sound represented by the audio data; and
wherein generating the change to the aspect of the object in the virtual environment comprises:
  generating a change to an aspect of the object that is correlated with the frequency of the sound.

19. The non-transitory computer-readable medium of claim 14, wherein the predetermined sound quality is a wavelength of a sound represented by the audio data; and
wherein generating the change to the aspect of the object in the virtual environment comprises:
  generating a change to an aspect of the object that is correlated with the wavelength of the sound.

20. The non-transitory computer-readable medium of claim 14, wherein the predetermined sound quality is a beat in the sound represented by the audio data; and
wherein generating the change to the aspect of the object in the virtual environment comprises:
  generating a change to an aspect of the object that is correlated with the beat in the sound.

* * * * *